United States Patent [19]

Hayashi et al.

[11] Patent Number: 5,506,486
[45] Date of Patent: Apr. 9, 1996

[54] CONTROL APPARATUS FOR COMPRESSOR WITH INDUCTION MOTOR

[75] Inventors: Norio Hayashi; Takashi Ogawa; Masaaki Takezawa; Keishiro Igarashi, all of Gunma, Japan

[73] Assignee: Sanyo Electric Co., Ltd., Morigushi, Japan

[21] Appl. No.: 109,306

[22] Filed: Aug. 20, 1993

[30] Foreign Application Priority Data

Aug. 21, 1992 [JP] Japan ................................... 4-222795

[51] Int. Cl.$^6$ ....................................................... H02P 5/28
[52] U.S. Cl. ........................... 318/808; 318/811; 318/812; 363/26; 62/228.4
[58] Field of Search ............................... 60/395; 62/215, 62/158, 228.4, 228.1, 230, 510, 6; 417/28, 295, 321; 318/802, 800, 812, 801, 808, 807, 809, 811; 363/36, 37, 41, 25, 26

[56] References Cited

U.S. PATENT DOCUMENTS

| | | | |
|---|---|---|---|
| 3,628,042 | 12/1971 | Jacobus | 60/395 |
| 3,691,785 | 9/1972 | Ruff et al. | 62/230 |
| 4,151,725 | 5/1979 | Kountz et al. | 62/228.4 |
| 4,310,791 | 1/1982 | Akamatsu | 318/800 |
| 4,407,139 | 10/1983 | Ide et al. | 62/215 |
| 4,524,310 | 6/1985 | Nagase et al. | 318/808 |
| 4,625,159 | 11/1986 | Ikejima | 318/811 |
| 4,656,571 | 4/1987 | Umezu | 363/37 |
| 4,698,744 | 10/1987 | Itani et al. | 318/811 |
| 4,720,245 | 1/1988 | Takata et al. | 417/28 |
| 5,119,071 | 6/1992 | Takezawa et al. | 318/811 |
| 5,300,872 | 4/1994 | Endo et al. | 318/802 |

FOREIGN PATENT DOCUMENTS

| | | |
|---|---|---|
| 57028591 | 6/1982 | Japan . |
| 63001375 | 1/1988 | Japan . |
| 2190519 | 11/1987 | United Kingdom . |

*Primary Examiner*—John W. Cabeca
*Attorney, Agent, or Firm*—Darby & Darby

[57] ABSTRACT

A control apparatus for compressor with induction motor includes a microcomputer which evaluates an optimum number of rotations at which an operation efficiency of a compressor becomes a maximum when a frequency of an alternating current electric power applied to an induction motor in accordance with a change of a load. An inverter circuit is controlled by the microcomputer, and therefore, a voltage outputted from the inverter circuit is adjusted such that the induction motor becomes the optimum number of rotations.

5 Claims, 17 Drawing Sheets

F I G. 2
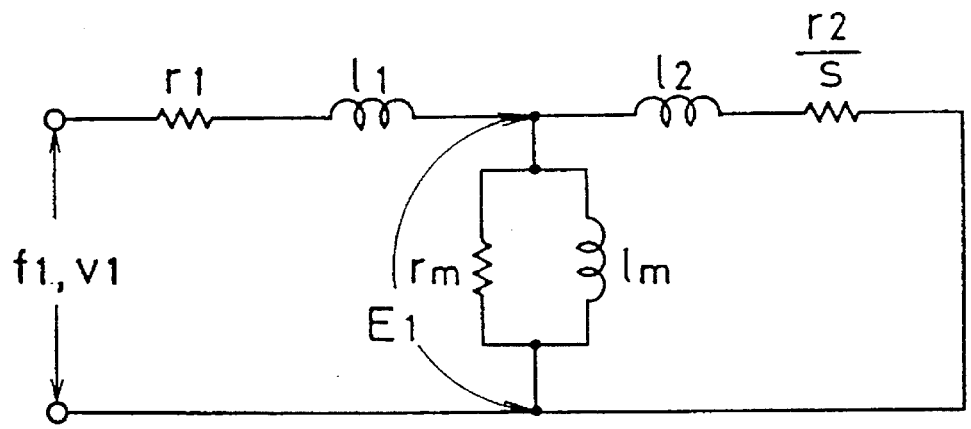

F I G. 10
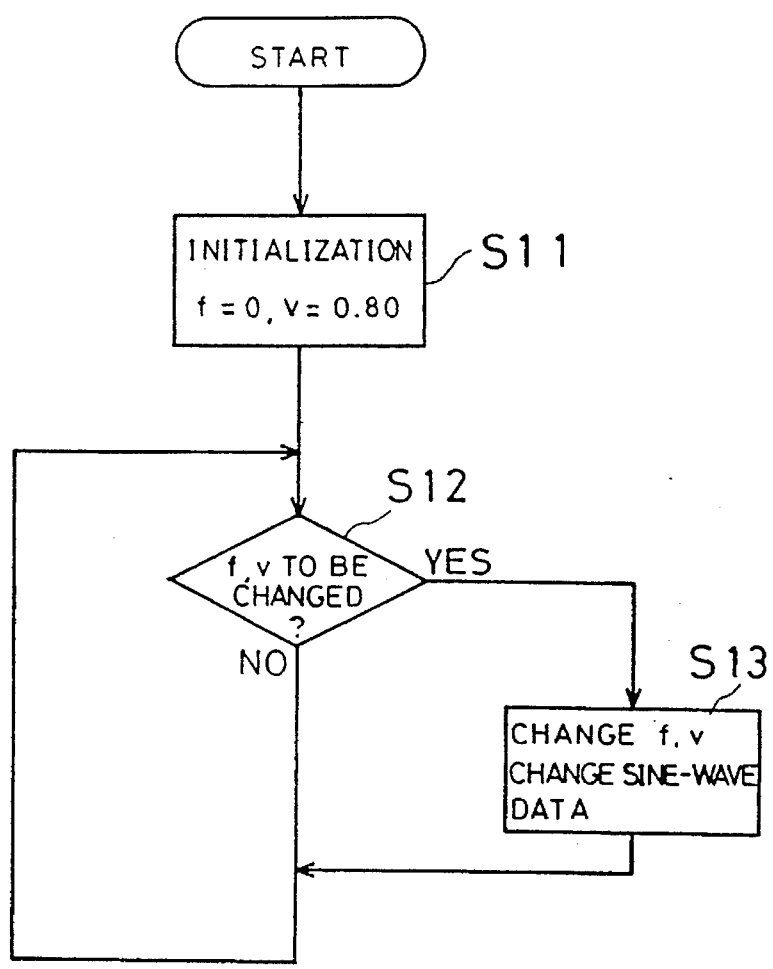

F I G. 13
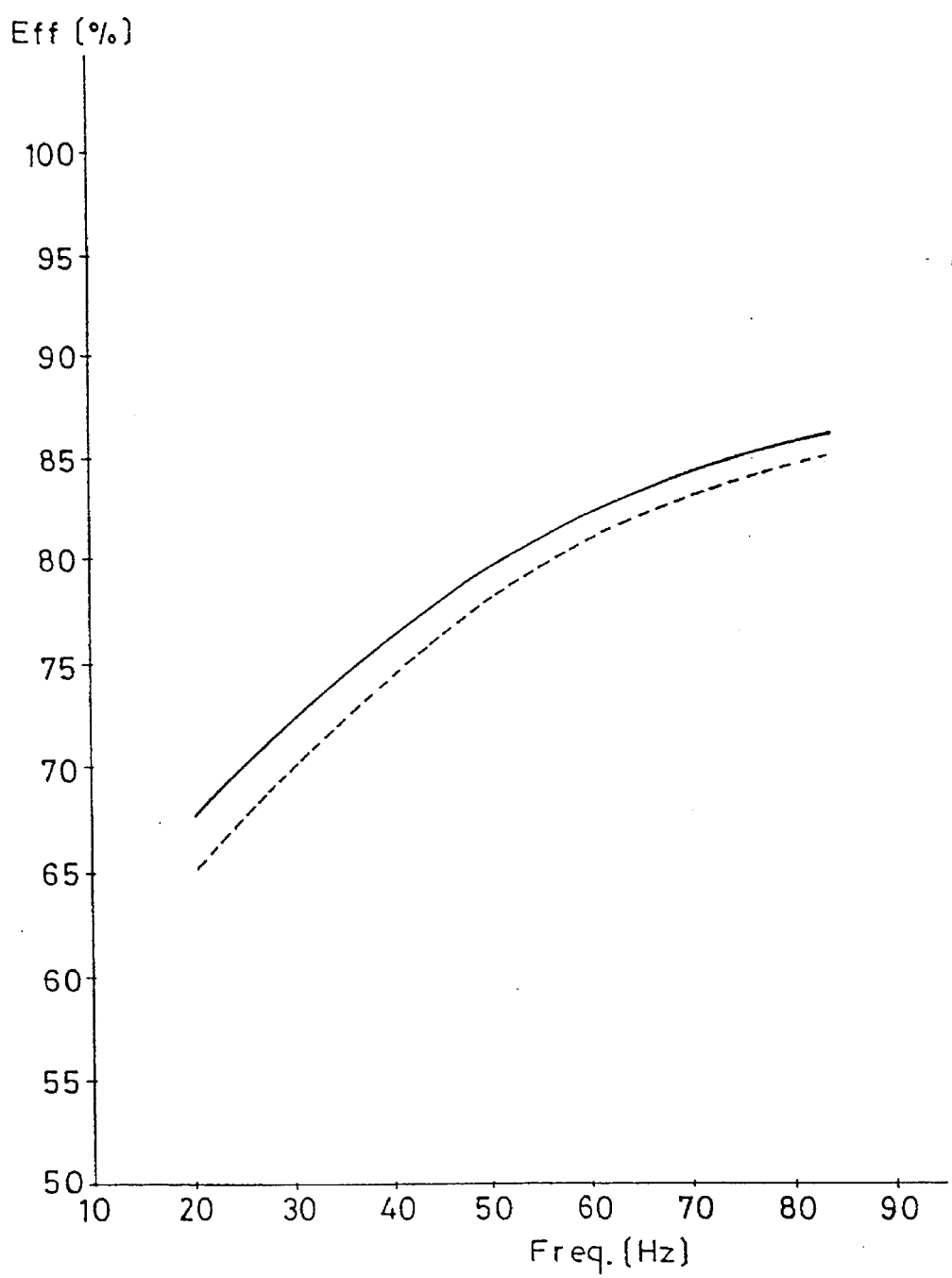

CONTROL APPARATUS FOR COMPRESSOR WITH INDUCTION MOTOR

BACKGROUND OF THE INVENTION

1. Field of the Invention

The present invention relates to a control apparatus for compressor with induction motor. More specifically, the present invention relates to an apparatus and method for controlling an induction motor which drives a compressor included in a refrigeration cycle.

2. Description of the Prior Art

In a refrigeration cycle, an induction motor which drives a compressor is controlled such that a frequency f of an alternating current electric power is changed according to a change of a load of the refrigeration cycle. At this time, a voltage v of the alternating current electric power is controlled in a manner that a value of v/f becomes always constant with respect to the change of the frequency f. Then, the value of v/f is set such that an operation efficiency of the compressor becomes maximum in a stable state of the compressor, that is, in a state where a slip of the induction motor exists within a predetermined range. Therefore, at a time that the load is changed, that is, at a time that the change of the frequency f is rapid, since the induction motor becomes a light-load or an overload, the slip of the induction motor is changed, and accordingly, a larger exciting current flows or a larger load current flows, and thus, the operation efficiency of the compressor becomes to be lowered.

One method for solving such a problem is disclosed in Japanese Patent Application Laying-open No. 61(1986)-20236 for example. In this prior art, a power factor of the alternating current electric power which is supplied to the induction motor is evaluated, and the voltage of the alternating current electric power is controlled such that the power factor becomes maximum. However, in the prior art, if a wave-form of the alternating current electric power supplied to the induction motor contains a distortion, especially, a distortion due to harmonic waves, detection accuracy of the power factor decreases and therefore, it is uncertain to expect that the operation efficiency is increased. More specifically, if the alternating current electric power obtained from a commercial power source is directly supplied to the induction motor, the detection accuracy of the power factor is good since the distortion contained in the wave-form of the alternating current electric power is small; however, if the alternating current electric power of a false sine-wave generated by an inverter circuit of a PWM system is supplied to the induction motor, although the false sine-wave is smoothed to some degree by an inductance component of the stator windings of the induction motor, the current wave-form still contains a distortion, and therefore, the operation efficiency can not be increased sufficiently. Especially in a case of an induction motor having a small output power (less than few kw), such a problem is magnified.

A further method is disclosed in Japanese Patent Application Laying-open No. 4(1992)-33584, for example. In the further prior art, the slip is detected on the basis of a wave-form of a current flowing in the induction motor, and it is intended to improve the operation efficiency by changing the voltage to be applied to the induction motor in a manner that the slip becomes a predetermined value. However, in such a case, if a distortion is contained in the current wave-form, the detection accuracy of the slip is decreased. Furthermore, a detection circuit for detecting the slip becomes complex.

SUMMARY OF THE INVENTION

Therefore, a principal object of the present invention is to provide a novel control apparatus for a compressor which is driven by an induction motor.

Another object of the present invention is to provide a control apparatus for a compressor with an induction motor, in which operation efficiency of the compressor can be further improved.

The other object of the present invention is to provide a refrigeration cycle with good operation efficiency.

A control apparatus for compressor with induction motor according to the present invention comprises: optimum number of rotations evaluating means for evaluating an optimum number of rotations of an induction motor according to a frequency of an alternating current electric power applied to the induction motor, an operation efficiency of a compressor being maximum at the optimum number of rotations; and voltage control means for controlling a voltage of the alternating current electric power supplied to the induction motor such that the number of rotations of the induction motor becomes the optimum number of rotations.

In accordance with the present invention, even if the frequency of the alternating current electric power is changed according to a change of a load produced by the refrigeration cycle, the operation efficiency of the compressor is increased because the number of rotations of the induction motor becomes the optimum number of rotations, that is, the slip of the induction motor is made to occur within a predetermined range. Furthermore, in accordance with the present invention, since it is not necessary to detect a power factor or a current wave-form of the alternating current electric power, even if a false sine-wave from the inverter circuit of the PWM system is supplied to the induction motor, no lowering of the operation efficiency due to a decrease in the detection accuracy occurs.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an equivalent circuit diagram showing a single phase of an induction motor included in the embodiment;

FIG. 10 is a flowchart showing an operation of the microcomputer for forming a sine-wave;

FIG. 13 is a graph showing efficiency with respect to the frequency in the induction motor according to the embodiment;

DETAILED DESCRIPTION OF THE PREFERRED EMBODIMENTS

FIG. 2 is an equivalent circuit diagram per phase of an induction motor utilized in a compressor. A slip s can be evaluated as $s=f_2/f_1$ on the basis of a frequency $f_1$ of an alternating current electric power and a frequency $f_2$ of the actual number of motor rotations.

If a torque T of the induction motor is evaluated on the basis of the equivalent circuit shown in FIG. 2, with the following equation wherein m is the number of phases of the induction motor, P is the number of poles of the induction motor, $E_1$ is a primary induced voltage, $r_2$ is a secondary resistance, and $l_2$ is a secondary leakage reactance.

$$T = \frac{mp}{2\pi} \left( \frac{E_1}{f_1} \right)^2 \frac{f_2/r_2}{1 + (2\pi l_2)^2 \left( \frac{f_2}{r_2} \right)^2} \tag{1}$$

Similarly, an operation efficiency $\eta$ of the induction motor is computed by the following equation (2) wherein $r_1$ is a primary resistance, $l_1$ is a primary leakage reactance, $r_m$ is an iron loss, and $l_m$ is an exciting inductance.

$$\eta = \frac{1-s}{\left(1 + \frac{2r_1}{r_m}\right) + \frac{f_2 r_1}{r_2 f_1}\left(1 + \frac{2l_1}{l_m}\right)} + \frac{1-s}{\left\{\frac{r_2}{f_2} + (2\pi l_1)^2 \frac{f_2}{r_2}\right\}\left\{\frac{f_1}{r_m} + \left(\frac{f_1}{r_m}\right)^2 \frac{r_1}{f_1} + \left(\frac{1}{2\pi l_m}\right)^2 \frac{r_1}{f_1}\right\}} \tag{2}$$

Since equation (2) has a peak with respect to the slip s, the slip $s_m$ at a time that the operation efficiency $\eta$ becomes a maximum (peak) can be evaluated by the following equation (3) when $s_2 = sf_1$.

$$s_m = \frac{1}{1+\sqrt{1+\frac{X}{Y}}} \tag{3}$$

-continued $$X = \left(1 + 2\frac{r_1}{r_m}\right) + \frac{r_1}{r_2}\left(1 + \frac{l_1}{l_m}\right)^2 + (2\pi f_1)^2 \left(\frac{l_1}{r_2}\right)^2 \frac{r_2}{r_m}$$

$$Y = \frac{r_2}{r_m}\left(1 + \frac{r_1}{r_m}\right) + \frac{r_1}{r_2}\left(\frac{1}{2\pi f_1}\right)^2 \left(\frac{r_2}{l_m}\right)^2$$

That is, the slip $s_m$ at which the operation coefficient $\eta$ of the induction motor becomes maximum is function of the frequency f1 of the alternating current electric power.

Figure 3:
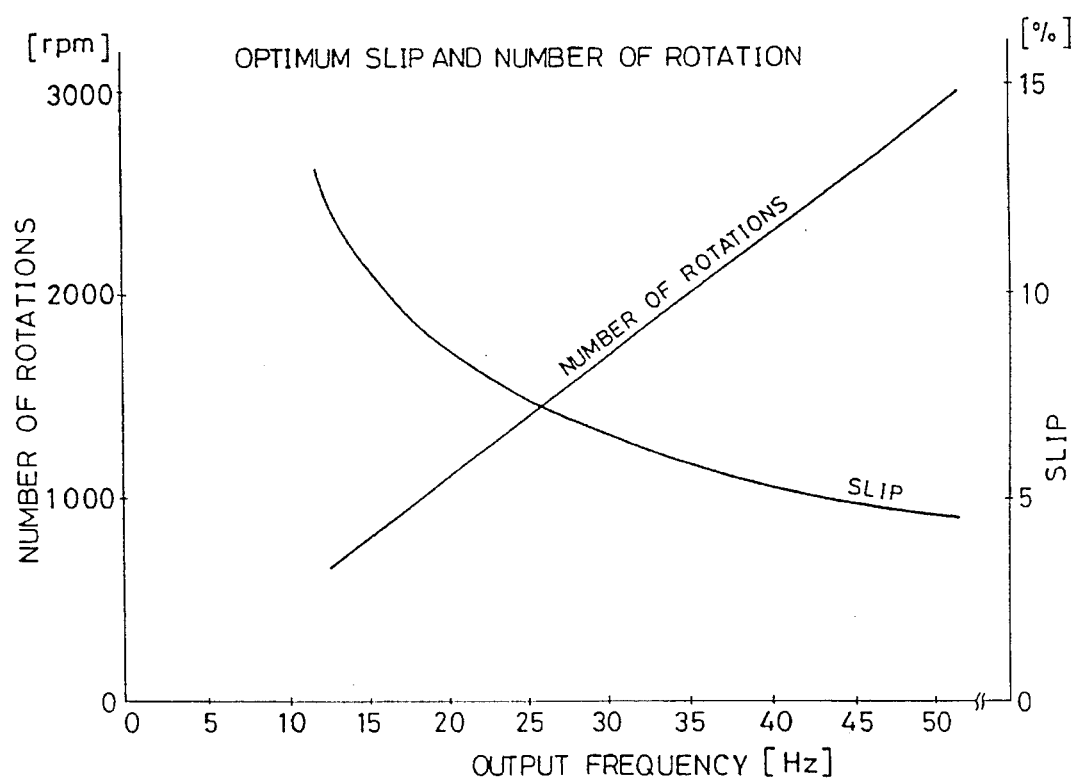
FIG. 3 is a graph showing a relationship between slip and a number of rotations of the induction motor with respect to a frequency; p

FIG. 3 is a graph showing a relationship between an optimum slip, that is, a slip at a time that the operation efficiency becomes maximum and an optimum number of rotations in a case where the frequency f1 of the alternating current electric power (output frequency) is changed. The slip and the number of rotations are evaluated according to equation (3). As the output frequency becomes higher, the operation efficiency can be kept high if the slip is made smaller. That is, the number of rotations with respect to the output frequency may be set as shown in FIG. 3.

The number of rotations has a relationship of approximately a linear line with respect to the output frequency. Therefore, in a practical control, the relationship is handled as a linear line. On the assumption that a frequency of the alternating current electric power supplied to the induction motor is f, the optimum number of rotations N at which the maximum operation efficiency is obtainable is represented by the following equation (4).

$$N = af + b \tag{4}$$

where a and b are constants.

Values of the constants a and b may be set as approximate values on the basis of the equation (3), or may be set by operating the induction motor actually. In the latter case, the frequency of the alternating current electric power is fixed while the voltage to be applied to the induction motor is changed so as to seek the number of rotations at which the maximum efficiency is obtainable. In the same manner, the number of rotations at which the maximum efficiency is obtainable is evaluated for each of a plurality of frequencies, and then, the constants a and b are set, respectively.

In accordance with the equation (4), the frequency of the alternating current electric power that is supplied to the induction motor, and the optimum number of rotations (the number of rotations at which the operation efficiency becomes maximum ) at a time that the alternating current electric power having this frequency is supplied to the induction motor are determined, respectively. Therefore, the voltage of the alternating current electric power may be changed such that the number of rotations of the induction motor becomes the optimum number of rotations.

Figure 1:
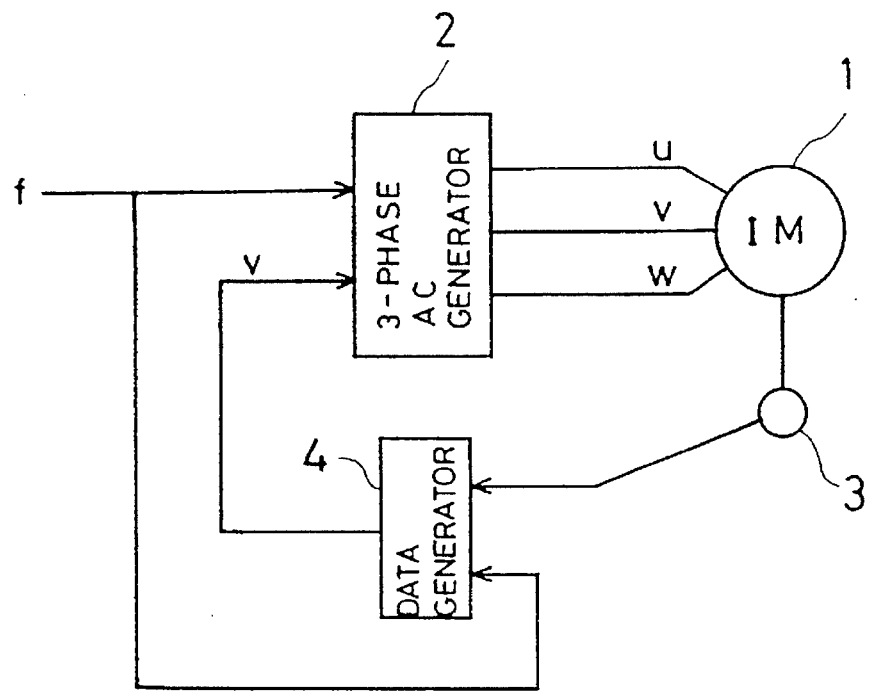
FIG. 1 is a block diagram showing one embodiment according to the present invention.

FIG. 1 is a schematic diagram showing one embodiment according to the present invention. A three-phase induction motor 1 is driven by a three-phase alternating current electric power that is supplied from a three-phase alternating current generator 2. When data of a frequency f and a voltage v are applied to the three-phase alternating current generator 2, the same generates the three-phase alternating current electric power having the frequency f and the voltage v. On the other hand, a rotation number detector 3 detects the number of rotations n of the induction motor 1. Furthermore, a data generator 4 generates data of the voltage v, and the data generator 4 increases or decreases the data value of the voltage v more than a predetermined minimum voltage such that a difference between the optimum number of rotations N that is determined on the basis of the frequency f and the number of rotations n of the induction motor 1 becomes zero. That is, the data value of the voltage v is increased when N>n, and the data value of the voltage v is decreased when N<n. The data value of the voltage v is supplied to the three-phase alternating current generator 2.

Figure 4:
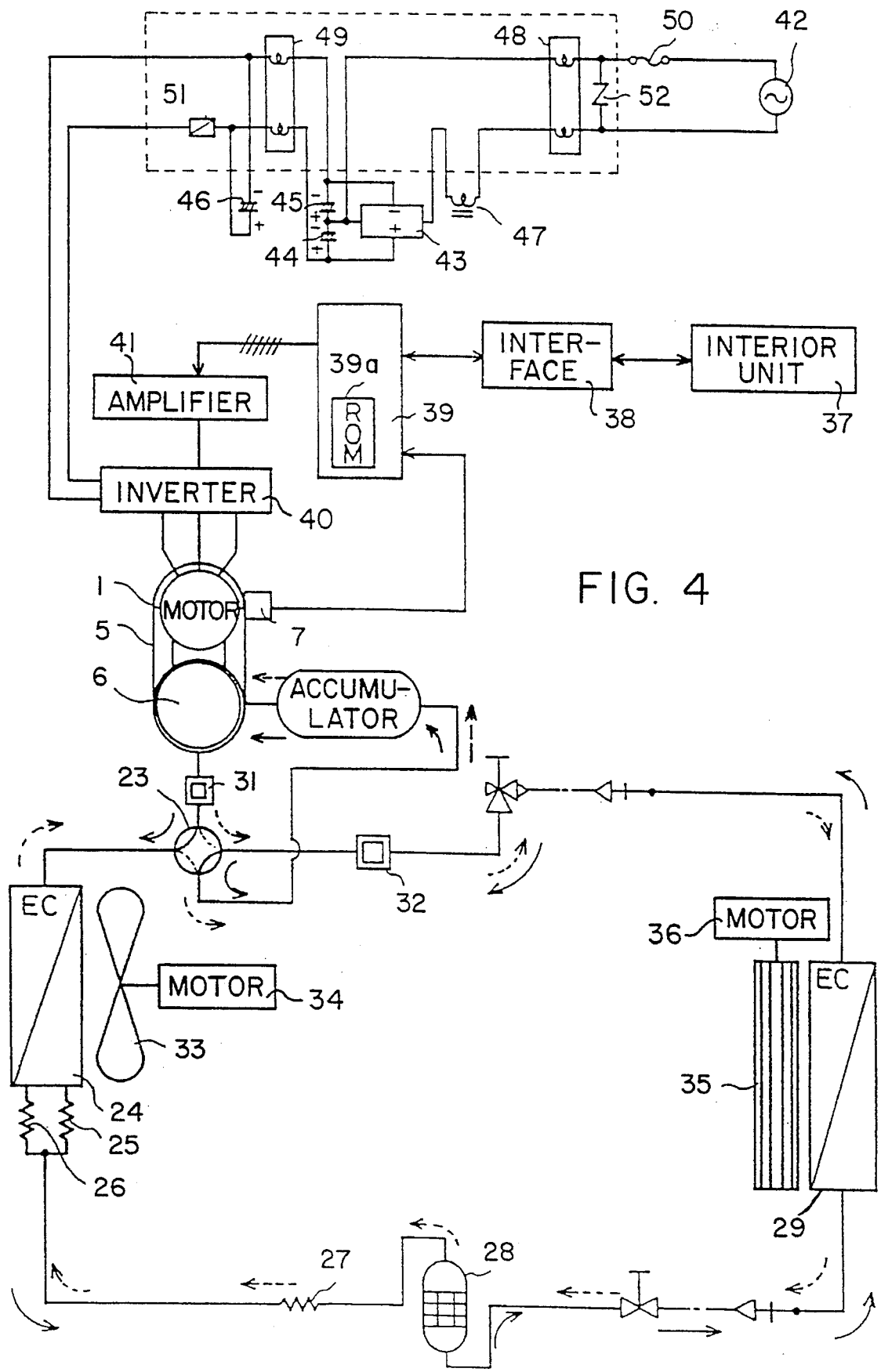
FIG. 4 is a block diagram showing an air-conditioner to which the embodiment is applied.
Figure 5:
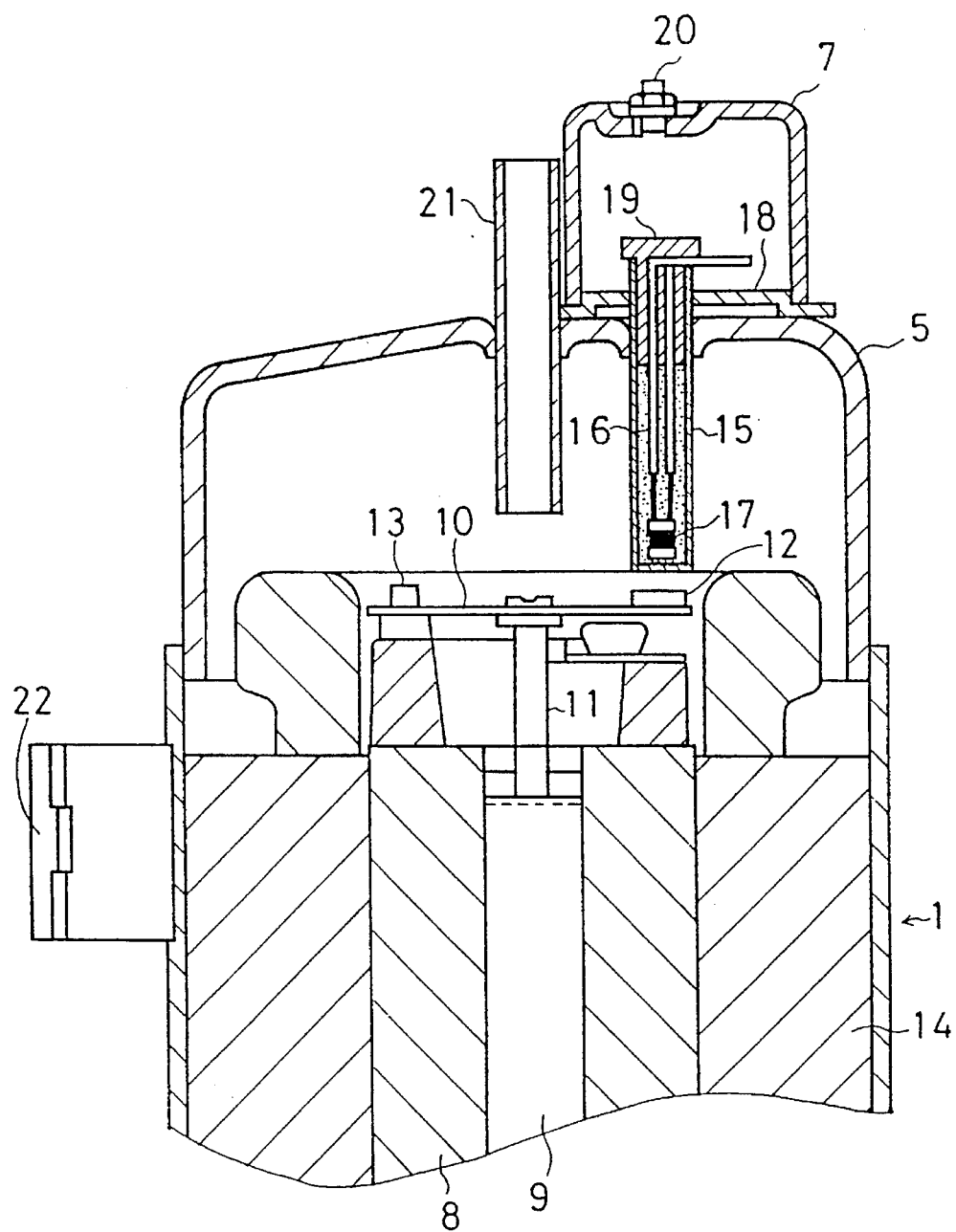
FIG. 5 is a cross-sectional view showing a major portion of a rotation signal detector.

FIG. 4 is a schematic diagram showing an air-conditioner to which the present invention is applied. The air-conditioner includes a hermetic type compressor 5 which includes a compressing portion 6 for compressing a refrigerant and the induction motor 1 for driving the compressing portion 6. A rotation signal outputting portion 7 is coupled to the induction motor 1 and outputs a pulse signal at every timing when the induction motor 1 is rotated by one rotation. Therefore, the number of rotations of the induction motor 1 can be detected by the above described rotation number detector 3 on the basis of the pulse signal. Structure of the rotation signal outputting portion 7 is shown in FIG. 5; however, one having structure shown in U.S. Pat. No. 5,119,071 may be utilized.

More specifically, as shown in FIG. 5, a rotor 8 of the induction motor 1 is rotated with a rotation shaft 9 as a center, and at the center of the rotation shaft 9, a rotation disc plate 10 is attached to the rotation shaft 9 by a bolt 11. A permanent magnetic 12 is fixed on the disc plate 10. A balancer 13 is provided at a symmetrical position with respect to the permanent magnetic 12 with centering a rotation center of the disc plate 10, and the same has a weight by which the permanent magnetic 12 is balanced in rotating the disc plate 10. In addition, a reference numeral 14 denotes a stator of the induction motor 1.

A copper pipe with bottom 15 is inserted into the compressor 5 from out side. The copper pipe 15 is attached to the compressor 5 while being shielded such that a high-pressure refrigerant cannot leak outside of the compressor 5. A magnetic detecting element, for example, a search coil 17 wound on a ferrite core, is attached to a tip end of the copper pipe 15 (the bottom of the copper pipe). The search coil 17 detects the magnetic flux of the permanent magnet 12, and an output signal according to a change of the magnetic flux is obtainable. Therefore, the output signal is obtained from the search coil 17 for every one rotation of the rotor 8. A lead-wire 16 for withdrawing the output signal is connected to the search coil 17, and an epoxy resin is filled in the copper pipe 15 after the lead-wire 16 and the search coil 17 are contained therein. In addition, reference numeral 18 denotes a gasket, and reference numeral 19 denotes a rubber cap covering an opening of the copper pipe 15. Thus, the rotation signal outputting portion 7 is constructed, and the rotation signal outputting portion 7 is fixed by a bolt 20. Furthermore, reference numeral 21 denotes a discharge pipe for discharging a compressed refrigerant, and reference numeral 22 denotes a fixing metal for an accumulator.

Returning to FIG. 4, a four-way directional control valve 23, a heat exchanger at heat source side 24, a pressure reducing device, for example, capillary tubes 25–27, a strainer 28, a heat exchanger at use side 29, and an accumulator 30 are connected to each other by a refrigerant pipe arrangement to construct a refrigeration cycle. When the four-way directional control valve 23 is in a state shown by a solid line in FIG. 4, the compressed refrigerant discharged from the compressor 5 flows in a direction shown by solid line arrow marks, and the heat exchanger at heat source side 24 functions as a condenser, and the heat exchanger at use side 29 functions as an evaporator, and therefore, a cooling operation of a room is performed by utilizing the heat exchanger at use side 29.

When the four-way directional control valve 23 is changed to a state shown by a dotted line in FIG. 4, the compressed refrigerant discharged from the compressor 5 flows in a direction shown by dotted line arrow marks, and the heat exchanger at use side 29 functions as a condenser and the heat exchanger at heat source side 24 functions as an evaporator, and therefore, a warming operation of a room is performed by utilizing the heat exchanger at use side 29.

In addition, reference numerals 31 and 32 denote noise reducers, a reference numeral 33 denotes a propeller fan which is driven by an induction motor 34 to blow the window to the heat exchanger at heat source side 24. A reference numeral 35 denotes a cross-flow fan which is driven by an induction motor 36 to supply a conditioned air that is heat-exchanged (heated/cooled) by the heat exchanger at use side 29 into the room.

In addition, the heat exchanger at use side 29, the cross-flow fan 35, the induction motor 36, a room controller (not shown), and etc. are mounted within an interior unit 37. The air-conditioner of this embodiment shown is constructed by the interior unit 37 and an exterior unit (not shown), and the both units are connected to each other by a refrigerant pipe arrangement and signal lines, and the exterior unit is loaded with remaining components.

Signals for controlling operations of respective components within the exterior unit and a signal of the frequency f of the alternating current electric power to be supplied to the induction motor 1 are applied from the interior unit 37 to the exterior unit. On the other hand, signals from the exterior unit are applied to a microcomputer 39 via an interface 38.

The microcomputer 39 controls the operation of the exterior unit on the basis of the signals from the interior unit 37, and generates switching signals for obtaining a pseudo-sine-wave type output on the basis of a PWM theory. In addition, a generating method of the switching signals will be described later. The switching signals generated by the microcomputer 39 is applied to an inverter circuit 40 through an amplifier for switching 41.

Figure 6:
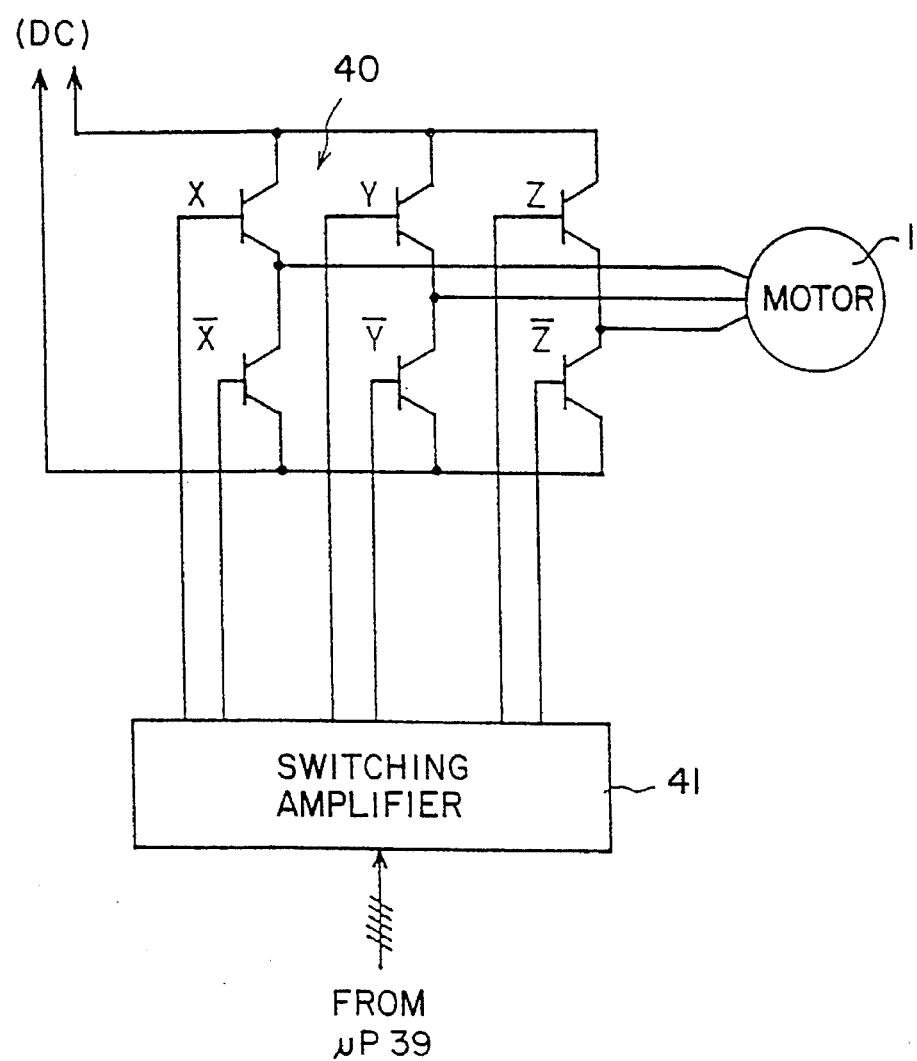
FIG. 6 is a circuit diagram showing an inverter circuit.

As shown in FIG. 6, the inverter circuit 40 includes a three-phase bridge composed of six power switching elements, and the six switching elements are turned-on or off by the switching signals, and therefore, pseudo-sine-waves of three phases are supplied to the induction motor 1. A direct current electric power applied to the inverter circuit 40 is obtained by rectifying a single-phase alternating current supplied from an alternating current power source 42 (FIG. 4) in a voltage-doubled manner. Such a voltage doubler rectifying is performed by a rectifying element 43 and smoothing capacitors 44 and 45. In addition, reference numeral 46 denotes a smoothing capacitor after the voltage doubler rectifying, a reference numeral 47 denotes a choke coil, reference numerals 48 and 49 denote noise filters, reference numerals 50 and 51 denote overcurrent fuses, and reference numeral 52 denotes a varister. Furthermore, as the switching elements X, X(–), Y, Y(–), Z and Z(–) shown in FIG. 6, it is possible to use a power transistor, a power FET, an IWGT, etc.

Figure 7A:
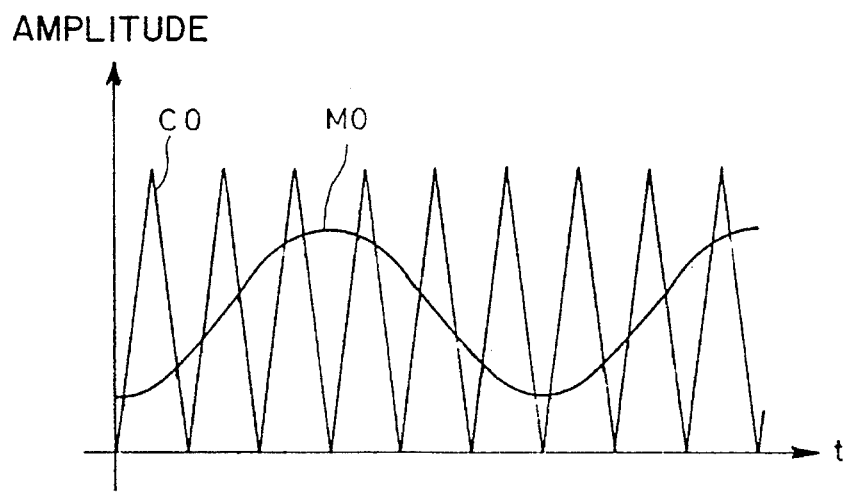
FIG. 7 is a wave-form chart showing a principle for generating a switching signal by a microcomputer in the embodiment.
Figure 7B:
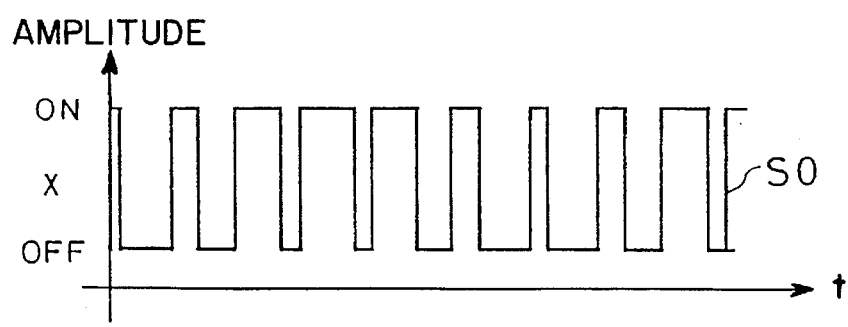
Figure 7C:
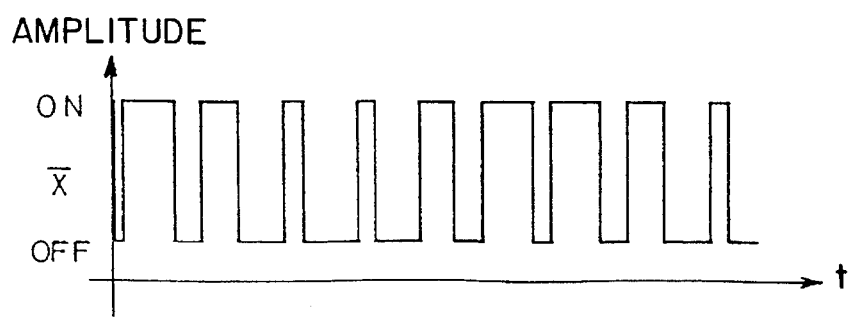
Figure 8A:
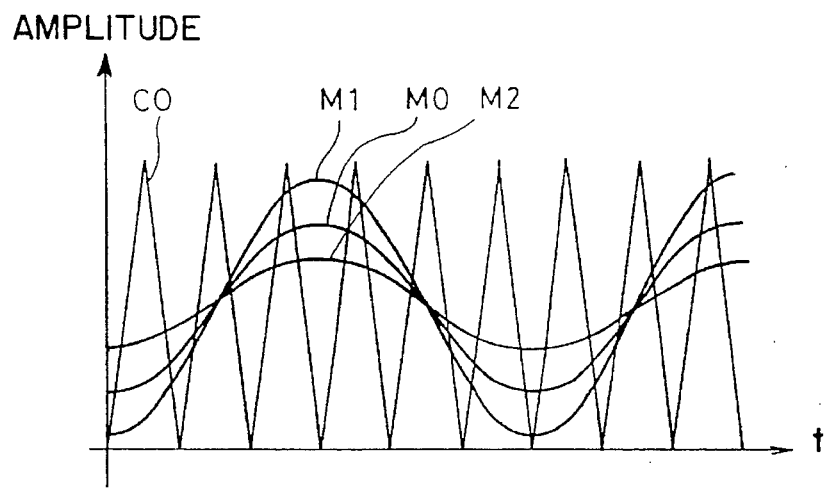
FIG. 8 is a wave-form chart showing a switching signal at a time that an amplitude of a modulation wave is changed in FIG. 7.
Figure 8B:
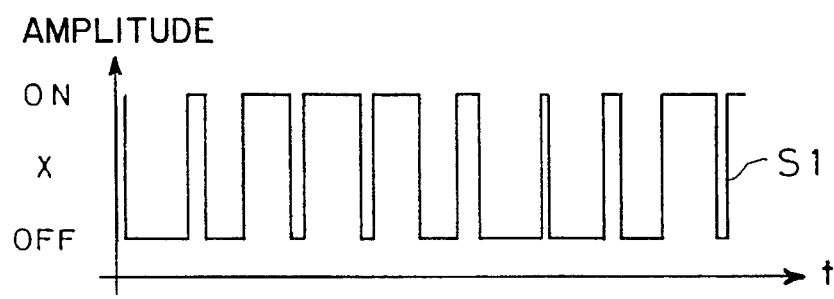
Figure 8C:
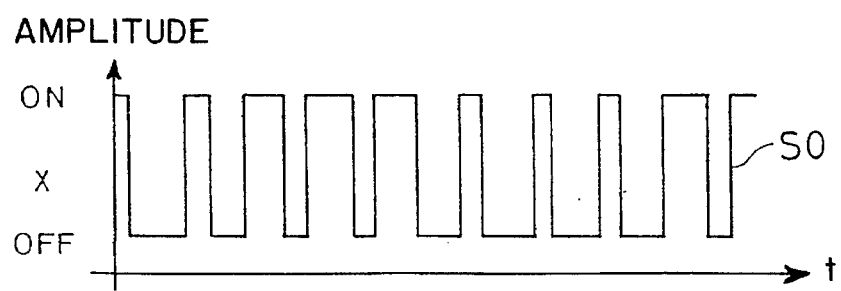
Figure 8D:
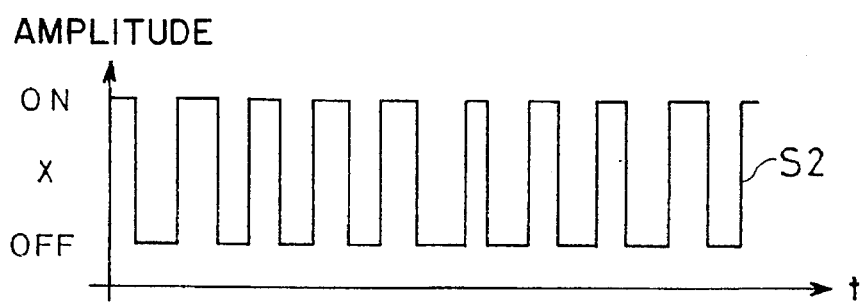

FIG. 7 is a wave-form chart showing a principle for generating the switching signals by the microcomputer 39. For example, a case where an on/off signal for the switching element X shown in FIG. 6 will be described. In addition, an on/off signal for the switching element X(–) is a signal obtained by inverting the on/off signal for the switching element X.

In FIG. 7, reference symbol C0 denotes a carrier wave (triangular wave, step-like triangular wave, sinewave and etc.), and reference symbol M0 denotes a modulation wave (sine-wave, step-like sine-wave and etc.). A frequency of the carrier wave C0, a frequency of the modulation wave M0 and a frequency ratio are not limited to ones shown in FIG. 7. In FIG. 7, simple frequencies are illustrated for convenience. An on/off signal S0 is a signal that becomes ON at a timing that the modulation wave M0 > the carrier wave C0.

An on/off signal for the switching element Y is an on/off signal obtained at a timing that the modulation wave M0 > the carrier wave C0 when a phase angle of the modulation wave M0 shown in FIG. 7 is advanced by 120 degrees, and an on/off signal for the switching element Y (–) is a signal obtained by inverting the on/off signal for the switching element Y. An on/off signal for the switching element Z is an on/off signal obtained at a timing that the modulation wave M0 > the carrier wave C0 when a phase angle of the modulation wave M0 shown in FIG. 7 is delayed by 120 degrees, and an on/off signal for the switching element Z(–) is a signal obtained by inverting the on/off signal for the switching element Z.

By utilizing such on/off signals, the direct current electric power is turned-on/off with the same pattern of the on/off signals shown in FIG. 7, whereby a pseudo-sine-wave type wave is generated. A period of the modulation wave M0 is equal to the frequency signal f, and by changing the period of the modulation wave M0, it is possible to change a frequency of the pseudo-sine-wave. If the period of the carrier wave C0 is made small, the number of on/off times during one period of the pseudo-sine-wave is increased, and therefore, a resolution of the false sinewave will be increased. In FIG. 7, the frequency of the carrier wave is illustrated in large for convenience.

FIG. 8 is the wave-form chart showing the on/off signals when an amplitude of the modulation wave is changed. In a case of a modulation wave M1 having an amplitude larger than that of the modulation wave M0, an equivalent voltage of a pseudo-sine-wave S1 becomes higher. In addition, the equivalent voltage is a voltage evaluated on the basis of a current flowing the induction motor when the pseudo-sine-wave is applied to the induction motor. The reason is that a difference between a maximum ON time and a minimum ON time, that is, an amplitude of the voltage becomes larger, and therefore, the voltage becomes larger. Furthermore, in a case where a modulation wave M2 having an amplitude smaller than that of the modulation wave M0, a pseudo-sine-wave S2 is obtained, and the equivalent voltage of the pseudo-sine-wave S2 becomes smaller than the equivalent voltage of the pseudo-sine-wave S0.

Therefore, by changing the amplitude of the modulation wave, the voltage of the three-phase alternating current electric power to be supplied to the induction motor 1 can be changed, and it is possible to change the frequency of the three-phase alternating current electric power by changing the frequency of the modulation wave.

Figure 9:
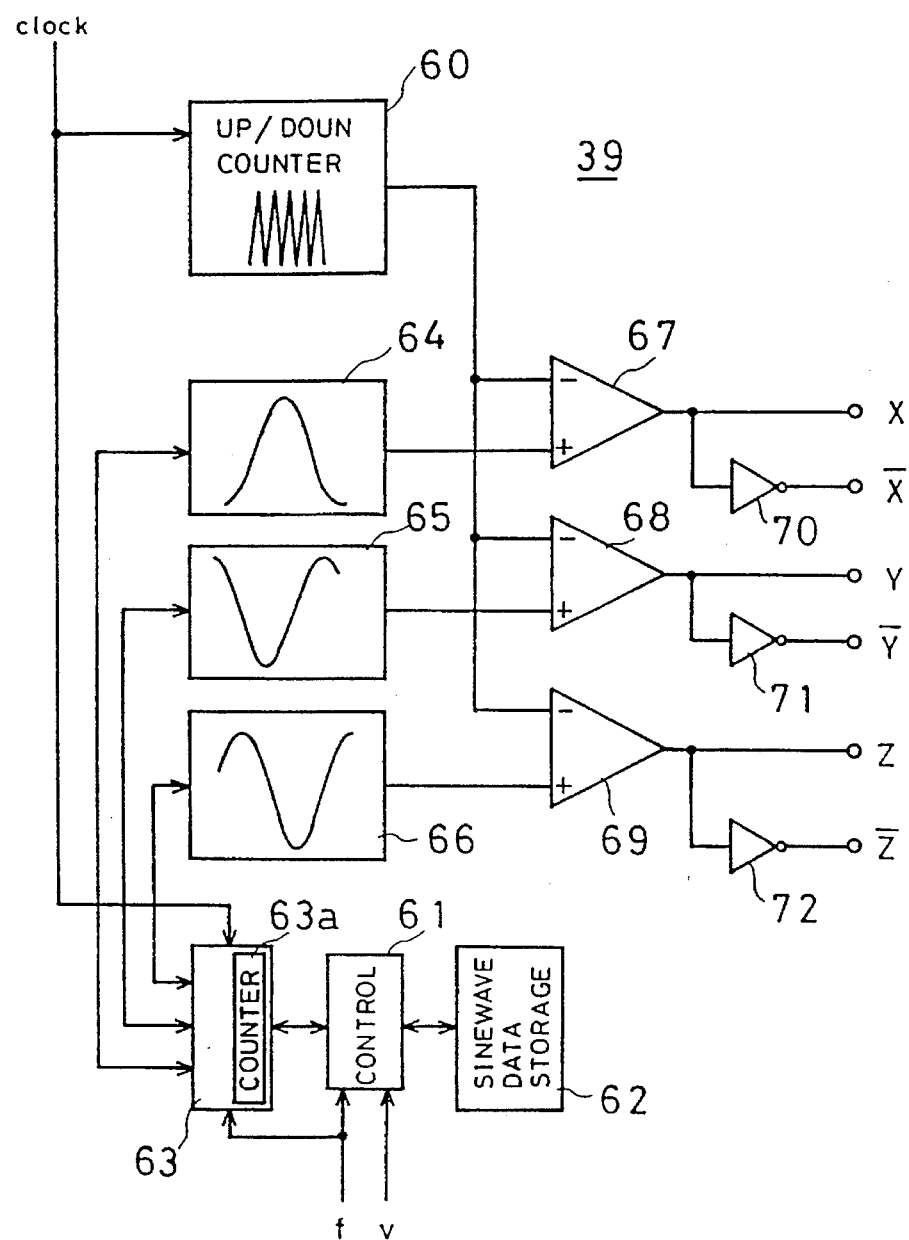
FIG. 9 is a functional block diagram showing a major portion of a microcomputer which generates the switching signal.

FIG. 9 is a functional block diagram of a major portion of the microcomputer 39 in generating the on/off signals. An up/down counter 60 of 16 bits is incremented/decremented in synchronism with a clock. More specifically, if a count value of the counter 60 reaches "FFFFH", the counter 60 is decremented in synchronism with the clock, and if the count value reaches "0000H", the counter 60 is incremented again. Therefore, the count value of the counter 60 is changed as a triangular wave of the carrier wave.

A sine-wave control portion 61 forms a sine-wave of a frequency f and a voltage (amplitude) v by data that is changed 0-FFFFH in each of storage areas 64, 65 and 66. The formation of the sine-wave is performed on the basis of a flowchart shown in FIG. 10.

Figure 11A:
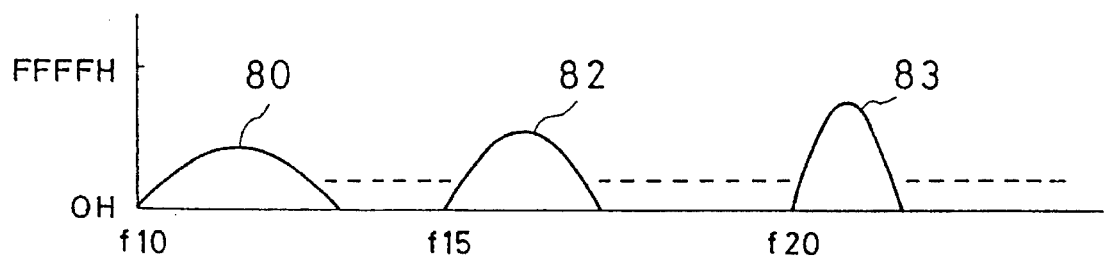
FIG. 11 is an illustrative view showing a method for forming the sine-wave.
Figure 11B:
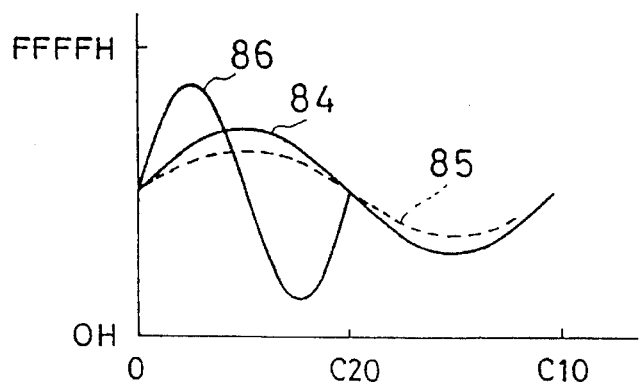

At first, in a step S11, initialization for f and v is performed (f=0, v=0.80). In addition, for convenience, f and v are made as f=0 and $10 \leq f \leq 150$ Hz, and $0.50 \leq v \leq 1.00$; however, the specific numeral ranges for the f and the v are not limited thereto. Then, in a step S12, it is determined whether or not a change of the frequency f or the voltage v is required. If "YES" is determined in the step S12, the process proceeds to a step S13, and the sine-wave data within the storage areas 64, 65 and 66 are rewritten. At this time, the sine-wave data is corrected by multiplying a value of the voltage v. Sine-waves 84, 85 and 86 shown in FIG. 11 indicate sine-wave data different from each other. The sine-wave 84 is a fundamental wave of f=10 and v=1.00, and the same is stored such that the value is changed as shown in FIG. 11 between addresses N0–N10. The sine-wave 85 is sine-wave data of f=10 and v=0.66 and the sine-wave 86 is sine-wave data of f=20 and v=1.00. In addition, the values of N10 and N20 are determined by a period of the clock. For example, if the clock of 100 kHz is utilized, N10=10000, and N20=5000.

Sine-waves (½ period) 80, 82 and 83 shown in FIG. 11 represent values (0H-FFFFH) of the sine-wave data stored in a sine-wave storage 62. In the sine-wave storage 62, the sine-wave data are stored with an indent of 1 Hz. In FIG. 11, f10, f15 and f20 indicate a start of each of the sine-wave data. An amplitude of each of these sine-wave data becomes larger as the frequency thereof becomes larger. That is, it is determined that v/f becomes constant with respect to the load that is set in advance.

For example, the sine-wave 84=FFFFH/2±the sine-wave 80/2, and the sine-wave 85=FFFFH/2±0.66× the sine-wave 80/2. Similarly, other sine-waves can be evaluated. That is, if the frequency f and the voltage v are obtained, in the step 14 shown in FIG. 10, it is possible to rewrite the sine-wave data within the storage areas 64, 65 and 66.

In addition, in order to make a description easy, each of the sine-waves 80, 82 and 83 of ½ period is illustrated in FIG. 11; however, the sine-wave of ¼ period may be utilized to reduce an occupation rate of the sine-wave storage 62.

Similarly, in order to make a description easy, each of the sine-waves 84, 85 and 86 of one period is illustrated in FIG. 11; however, it is possible to reduce an occupation rate of the sine-wave storage 62 by reducing the data to data of ¼ period.

Returning FIG. 9, reference numeral 63 denotes a distributor for the values of the sine-waves, which generates the values by which the phase angles are shifted by 120° degrees, respectively. For example, in a case of f=10 and v=1.00, that is, the sine-wave 84 shown in FIG. 11, a length of one period is 0–C10 (10000), and a position that the phase angle is shifted by 120° degree is step positions of 0, C10/3=3333, C10×⅔=6666.

Therefore, on the assumption that a count value of a basic counter 63a which is driven by the clock is C, CX= C($0 \leq C \leq 10$=10000, and when C=C10+1, CX 0 is obtained), CY CX+C10/3 (when CY>C10=10000, CY=CX +C10/3– C10 CX+3333–10000 is obtained), and CZ CX+C10× ⅔(when CZ>C10 10000, CZ CX+C10×⅔–C10 CX+6666– 10000 is obtained).

The values of the sine-waves corresponding to the values CX, CY and CZ of the counter 63a are corresponding to the values of the sine-waves 84 shown in FIG. 11. Therefore, in a case where the count value of the counter 63a is changed, the sine-waves are changed as illustrated in the respective storage areas 64, 65 and 66 shown in FIG. 9. The waveforms 64, 65 and 66 have phase angles shifted from each other by 120 degrees.

Thus, if the values of the frequency f and the voltage v are applied to the microcomputer 39, the values for three-phase sine-waves having the frequency f and the voltage v and phase angles shifted to each other by 120° degrees can be obtained by the inverter circuit 40.

In FIG. 9, reference numerals 67, 68 and 69 denote comparators which compare the values with each other, respectively. That is, the comparators 67, 68 and 69 compare the value of the triangular wave (carrier wave) supplied by the up/down counter 60 with the values of the sine-waves (modulation waves) supplied by the respective storage areas 64, 65 and 66, respectively, and an output of each of the comparators 67–69 becomes the high level when the value of the modulation wave is larger than the value of the carrier wave. Outputs of the comparators 67, 68 and 69 function as the on/off signals for the switching elements X, Y and Z shown in FIG. 6. Then, reference numerals 70, 71 and 72 denote inverting circuits which invert the outputs of the comparators 67, 68 and 69, respectively to obtain the on/off signals for the switching elements X(−), Y(−) and Z(−).

In addition, in a case where a delay time that each of the switching elements X, Y, Z, X(−), Y(−) and Z(−) is turned-on/off, especially, turned-off from an ON state is large, a delay circuit which delays a change of each of the signals from an OFF state to an ON state by a predetermined time may be inserted within a circuit for supplying the on/off signals to the switching elements.

Furthermore, in the above described comparators 67–69, digital data are compared with each other; however, comparators for comparing analog voltages with each other, respectively may be utilized by obtaining the analog voltages through D/A conversion of the data.

Figure 12:
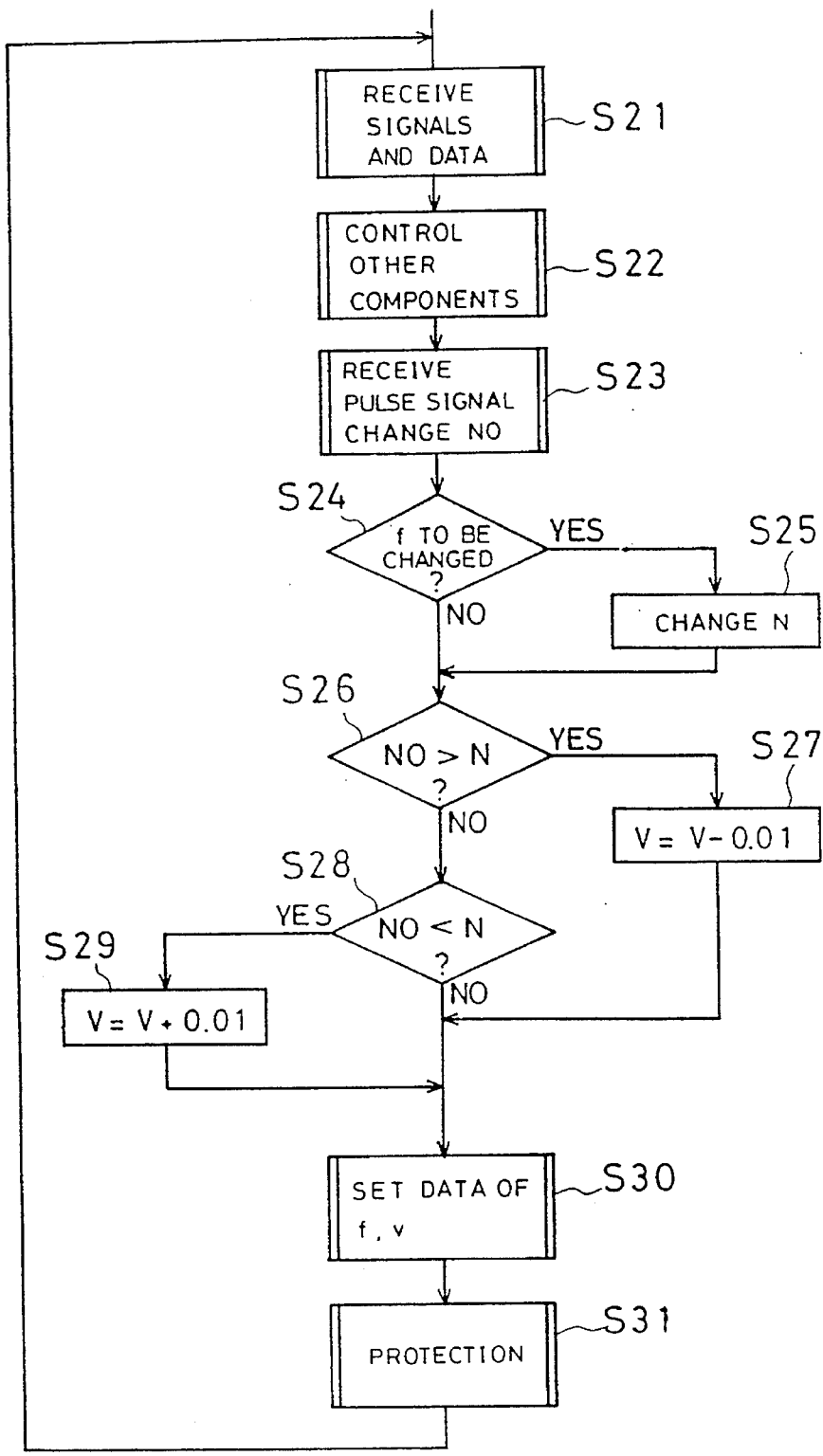
FIG. 12 is a flowchart showing an operation for setting a voltage by the microcomputer.

FIG. 12 is a flowchart showing an operation of a major portion of the arrangement for setting the value of the voltage v in the microcomputer 39. In addition, the value of the frequency f is evaluated by the interior unit 37 according to the load, which is then sent to the microcomputer 39.

In FIG. 12, a step S21 is executed after the microcomputer 39 is initialized. In the step S21, the signals from the interior unit 37, temperatures (outside air temperature, heat exchanger temperature, and so on), current flowing in the induction motor, and etc. are inputted to the microcomputer 39.

In a next step S22, controls for other equipments are performed on the basis of the signals and etc. inputted in the step S21. For example, switching of the four-way directional control valve 23, an operation of the induction motor 34, a defrost control of the heat exchanger at heat source side 24, and etc. are performed.

Next, in a step S23, the pulse signal from the rotation signal outputting portion 7 is inputted, and the number of rotations per one second, that is, NO/sec is evaluated so as to renew the value of the NO that is equal to the number of rotations η of the induction motor 1. The renewal of the NO is performed at every 0.5 seconds.

In a next step S24, it is determined whether or not the value of the frequency f is changed, that is, it is determined whether or not the value of the frequency f that is transmitted from the interior unit 37 is changed, if such a condition in the step S24 is satisfied, the process proceeds to a step S25. In the step S25, a target number of rotations N that is equal to the optimum number of rotations N is evaluated. The target number of rotations N is evaluated by utilizing the aforementioned equation (4). The target number of rotations N may be set by looking-up a table in which the frequency f and the target number of rotations N at which the operation efficiency becomes maximum are stored in advance.

In a step S26 and a step S28, the actual number of rotations NO of the induction motor 1 and the target number of rotations N are compared with each other, and when NO>N, the process proceeds to a step S27 wherein the value of the voltage is changed to v=v−0.01, and when NO<N, the process proceeds to a step S29 wherein the value of the voltage v is changed to v v+0.01. That is, the voltage of the three-phase alternating current electric power to be supplied to the induction motor 1 is lowered so as to decrease the number of rotation of the induction motor 1 when NO>N, and the voltage is raised so as to increase the number of rotation of the induction motor 1 when NO<N. In addition, both the conditions in the step S26 and the step S28 are not satisfied, the change of the voltage v is not performed.

In a next step S30, the values of the frequency f and the voltage v thus obtained are supplied to the sine-wave control portion 61 within the microcomputer 39, and therefore, the on/off signals for obtaining the three-phase alternating current of the frequency f and the voltage v are generated by the microcomputer 39. The switching elements are driven by the on/off signals such that the three-phase alternating current electric power is supplied to the induction motor 1.

Next, in a step S31, a protection operation is performed. For example, the air-conditioner may be protected from a temperature abnormality of the compressor, an abnormality of an overcurrent, and etc.

FIG. 13 is a characteristic chart of an induction motor itself in embodying the above described embodiment of the present invention. As the induction motor, a motor having a rating of three-phase two-pole, torque=0.17 kg-m (60 Hz, 132 v) is utilized. In this characteristic chart, a dotted line indicates a characteristic of a case where the present invention is not embodied, that is, a case where the value of v/f is constant for all the frequencies while a starting characteristic at a low frequency is taken into consideration. A solid line is a characteristic of a case where the present invention is embodied, that is, a case where the value of v/f, that is, the value of the voltage v is changed so as to feed-back control the number of rotations. It will be able to be understood from FIG. 13 that the operation efficiency of the induction motor is increased by the present invention in comparison with the prior art.

Figure 14:
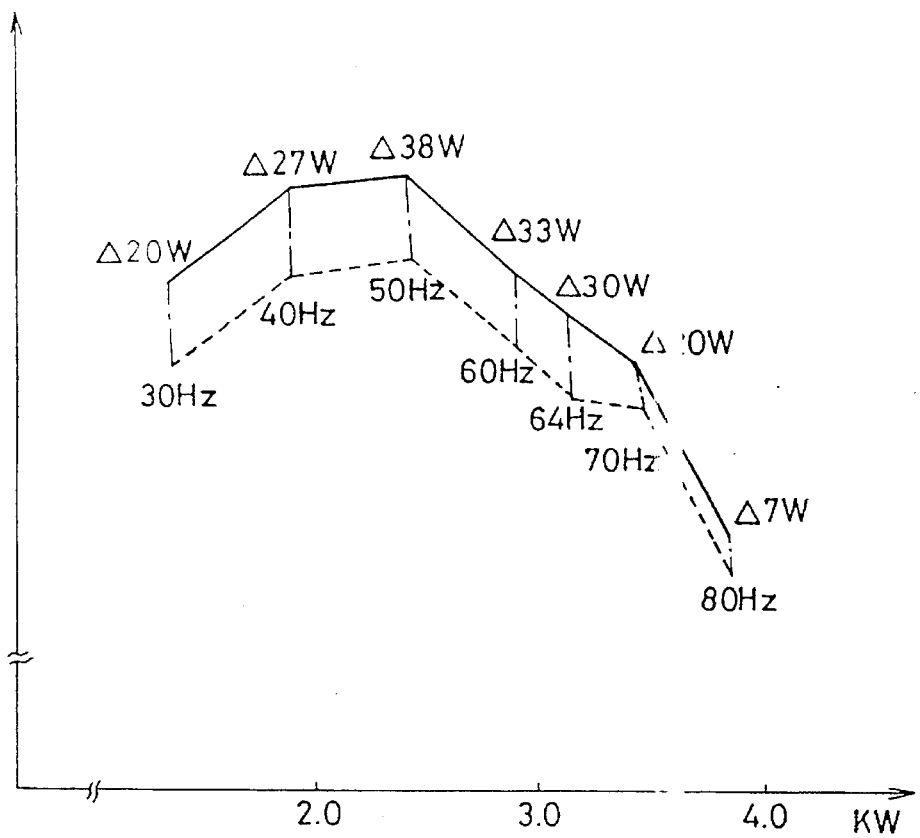
FIG. 14 is a graph showing an efficiency with respect to an electric power of the air-conditioner of FIG. 4 embodiment.

FIG. 14 is a characteristic chart showing a change of the operation efficiency of air-conditioner (COP) when the induction motor having the characteristic shown in FIG. 13 is utilized for the compressor shown in FIG. 4. FIG. 14 shows a case where the air-conditioner is operated under a standard warming condition (room temperature=20° C., and outside air temperature=7/6° C. (dry/wet)). The characteristic chart shows the operation efficiency with respect to an operation capacity (kw), and a solid line indicates a characteristic of the air-conditioner in which the present invention is embodied, and a dotted line indicates a characteristic of the prior art air-conditioner. For example, when the frequency of the three-phase alternating current electric power to be supplied to the compressor is 30 Hz, it is possible to reduce consumption of electric power by 20 w, and the consumption of electric power by 27 w at 40 Hz, 38 w at 50 Hz, . . . Therefore, between 30 Hz to 80 Hz, the operation efficiency (COP) is increased 5% on average. Such improvement of the operation efficiency is large in the low frequency region especially, and in the high frequency region, the difference between the operation efficiency according to the present invention and that of the prior art becomes small.

Therefore, the present invention may be embodied for only a frequency range in which the operation efficiency (COP) of the air-conditioner can be sufficiently increased, less than 80 Hz, for example. In such a case, a condition determination step may be added such that the steps S23–S29 shown in FIG. 12 are executed only a time that the frequency f falls within a predetermined frequency range.

Figure 15:
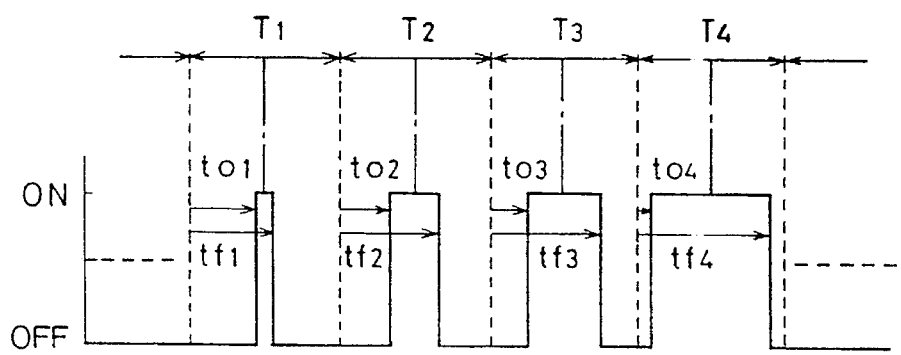
FIG. 15 is an illustrative view showing another embodiment for generating a false sine-wave.

FIG. 15 is an illustrative view showing another embodiment for generating a pseudo-sine-wave type voltage which is supplied to the induction motor 1. FIG. 15 indicates a switching signal for turning-on/off a single switching element of the six switching elements constituting the inverter circuit 40. By generating such a switching signal for each switching element, it is possible to obtain a pseudo-sine-waves of three phases.

It is indicated in FIG. 7 that ON and OFF of the switching signal respectively occur once during one period of the carrier wave. Therefore, in order to change the voltage, times of ON and OFF of the switching signal within the one period of the carrier wave may be changed. In FIG. 15, a time period $T_1 - T_4$ is one period of the carrier wave, and a time period the same is T seconds, for example, ⅓ k seconds approximately. On the assumption that ON and OFF of the switching signal are symmetric during one period of the carrier wave, if a time to (t01, t02, t03 and t04) is determined, a time tf (tf1, tf2, tf3 and tf4) becomes tf=T-t0.

Figure 16A:
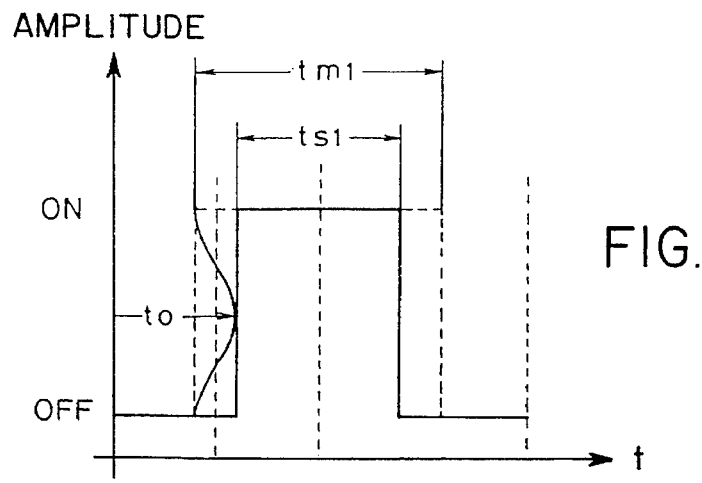
FIG. 16 is an illustrative view showing a change of the switching signal in FIG. 15 embodiment.
Figure 16B:
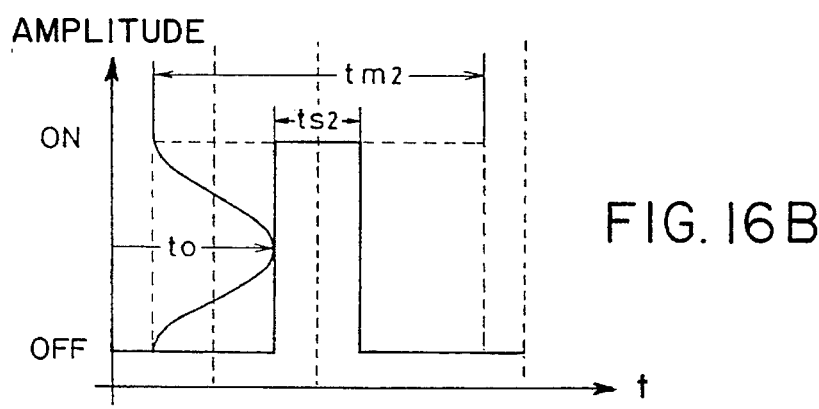
Figure 16C:
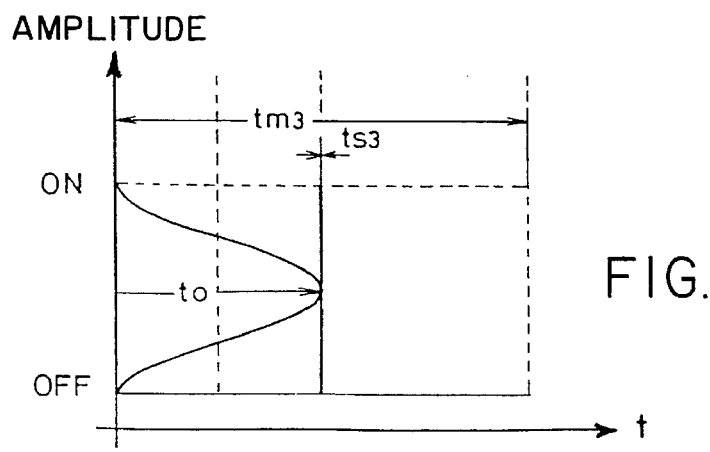

In order to obtain a pseudo-sine-wave on the basis of the PWM theory, the time (tf-t0) during which the ON switching signal is outputted may be changed in a sine-wave manner. Therefore, a time at which the switching signal is changed from OFF to ON within one period of the carrier wave may be set as $t0=A\times\sin(\omega t)+T/4$, where A is a constant, $\omega$ is an angular velocity, and t0 is changed as shown in FIG. 15. In FIG. 16, (a), (b) and (c) shows the switching signals obtained by increasing the constant A in this order.

By increasing the constant A, a changing width Ts1–tm1 (ts2–tm2, ts3–tm3) of the ON switching signal becomes larger. That is, by increasing the constant A, the amplitude of the pseudo-sine-wave becomes larger, and therefore, it is possible that the equivalent voltage of the three-phase alternating current electric power supplied to the induction motor can be made larger. Thus, by changing the value of the constant A, it is possible to control the voltage.

In addition, if the changing speed of $\omega t$ is made rapid, the frequency of the pseudo-sine-wave is changed. If such a system is made by a program which is executed by the microcomputer execute the program, the aforementioned generating system of the switching signals shown in FIG. 8 may be replaced with the generating system shown in FIG. 16.

Furthermore, a system for generating the pseudo-sine-wave is not limited to the above described embodiments, and an arbitrary system capable of changing the frequency of the pseudo-sine-wave and the equivalent voltage may be utilized.

Moreover, in the above described embodiment, the target number of rotations that is set for the induction motor is evaluated by the primary equation as shown by the equation (4); however, if a capacity of the microcomputer is insufficient, for example, small number of bits, low clock rate, the target number of rotations with respect to the frequencies are evaluated in advance and stored in the ROM 39a (FIG. 4), and the target number of rotations is read-out from the ROM 39a every time that the frequency is changed, it is possible to reduce the burden on the microcomputer.

Figure 17:
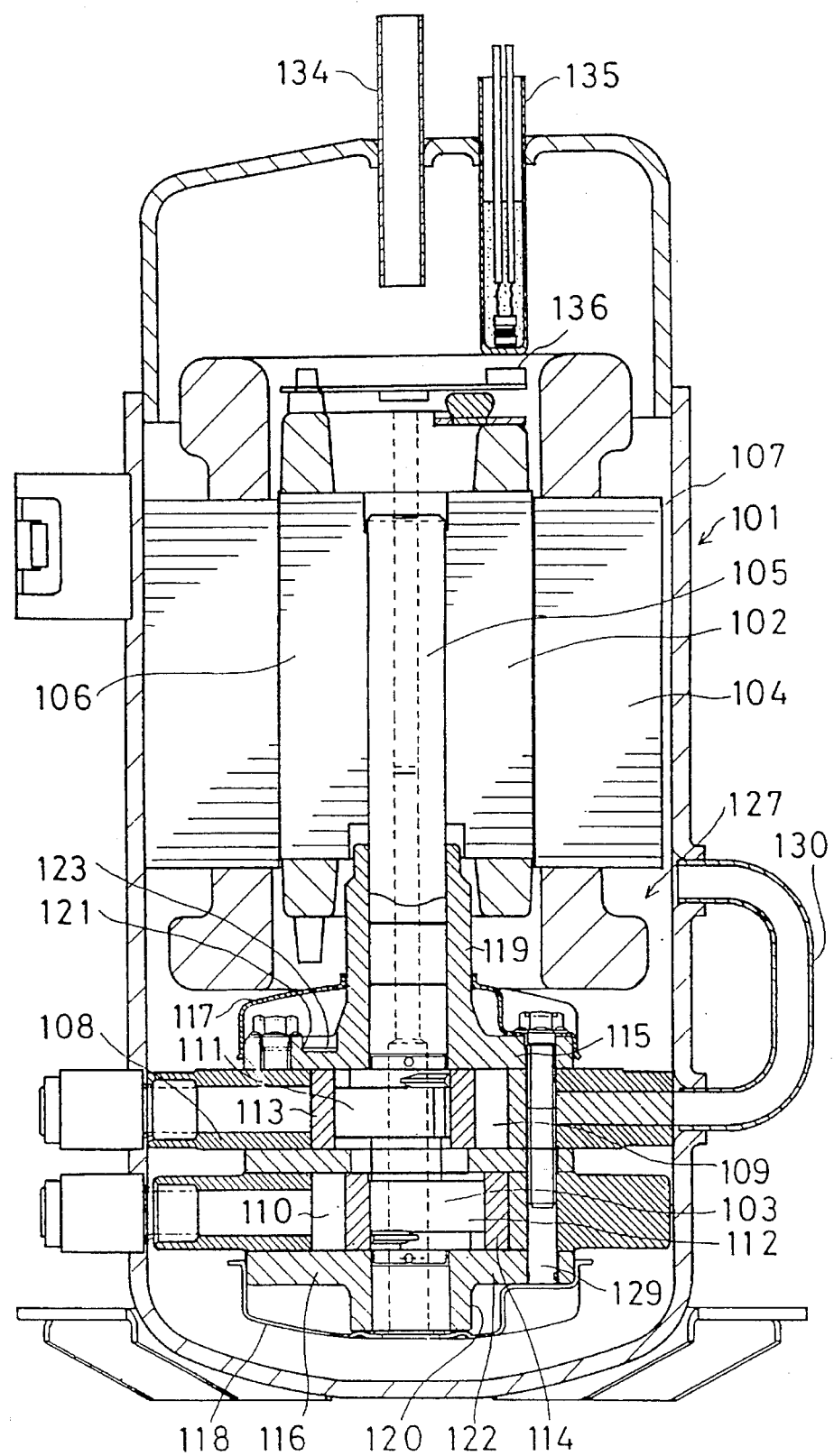
FIG. 17 is a cross-sectional view showing one example of a compressor to which the present invention can be applied.

FIG. 17 is a cross-sectional view showing a major portion of a compressor of another embodiment according to the present invention. In FIG. 17, reference numeral 101 denotes a hermetic container, and within the container 101, an electromotive element 102 and a rotating compressive element 103 which is driven by the electromotive element 102 are contained at an upper portion and a lower portion, respectively. The electromotive element 102 includes a stator 104 which is fixed onto an inner wall of the hermetic container 101 and a rotor 106 having a rotation shaft 105 within and at a center of the stator 104. The stator 104 is provided with a notch 107 for forming a gap between an outer periphery thereof and the inner wall of the hermetic container 101.

The rotating compressive element 103 includes an intermediate partition 108, a first cylinder 109 and a second cylinder 110 which are attached to an upper surface and a lower surface of the partition 108, respectively, eccentric elements 111 and 112 attached to the rotation shaft 105 in a manner that phases of the both are shifted to each other by 180° degrees, a first roller 113 and a second roller 114 which rotate within the cylinders 109 and 110 by the eccentric elements 111 and 112, respectively, a first frame (upper frame) 115 and second frame (lower frame) 116 attached to the first cylinder 109 and the second cylinder 110, respectively, and discharging mufflers 117 and 118. The first and second frames 115 and 116 are constructed by bearings 119 and 120 which support the rotation shaft, and flanges 121 and 122 for covering openings of the first and second cylinders 109 and 110. The flange 121 is provided with a discharging hole 123 which provides communication between inside of the cylinder 109 and an inside of the discharging muffler 117.

A reference numeral 129 denotes a communication path provided on the cylinders 109 and 110, which is communicated to an inside of the discharging muffler 118 of the second frame 116.

A reference numeral 130 denotes a bypass pipe provided outside the hermetic container 101, and the bypass pipe 130 has one end which is communicated to the communication path 129 and the other end which is communicated to a space 127 that is opened in opposite to the notch of the stator 104. A reference numeral 134 denotes a discharge pipe attached to an upper wall of the hermetic container 101.

A reference numeral 135 denotes a copper pipe which is the same as the copper pipe 15 shown in FIG. 16, and the search coil is attached to the copper pipe 135 and the search coil detects the magnetic flux of a permanent magnet 136 to obtain an output signal. The copper pipe 135 contains the lead wire and the search coil, and then, is filled by an epoxyresin.

Figure 18:
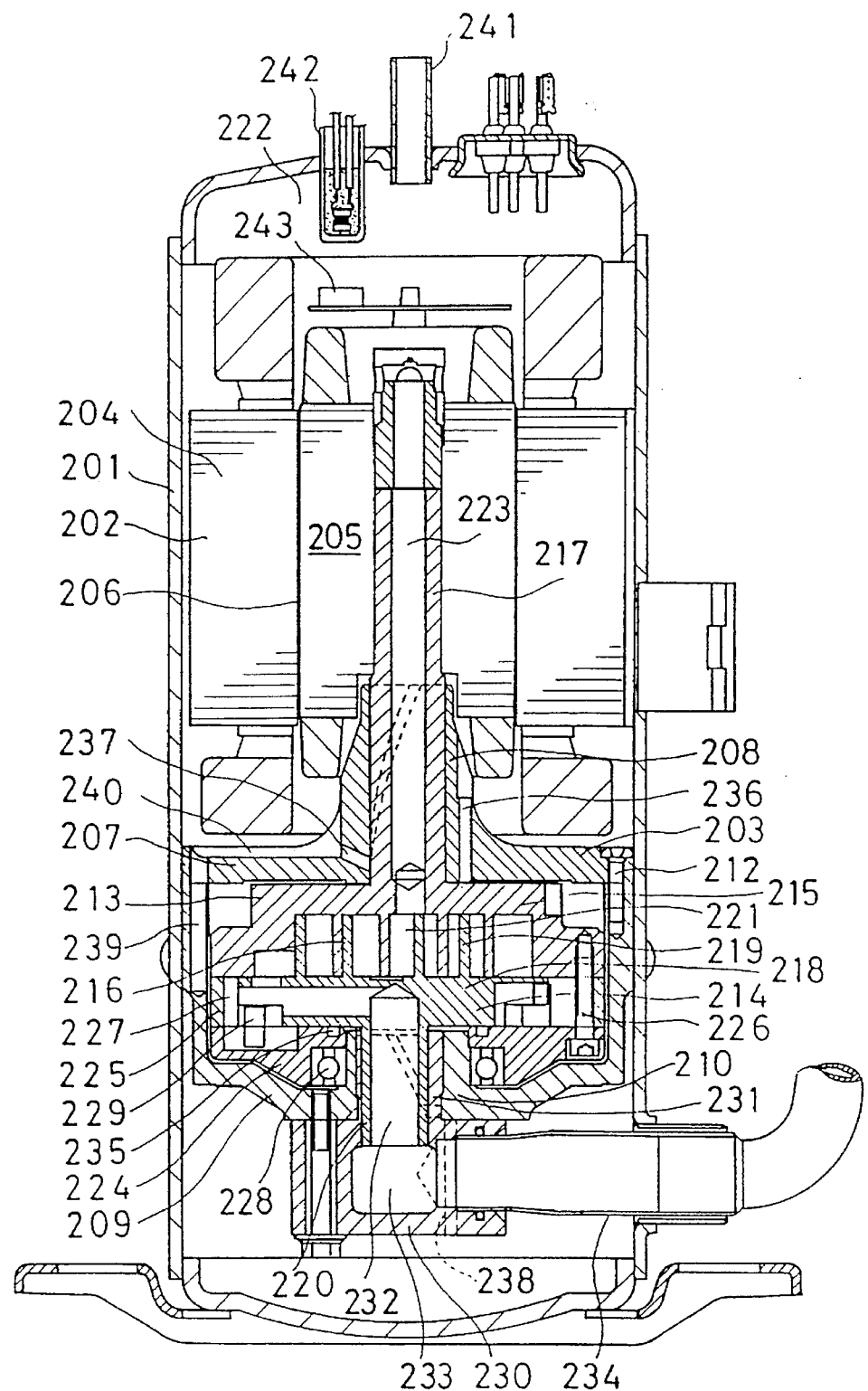
FIG. 18 is a cross-sectional view showing another example of a compressor to which the present invention can be applied.

FIG. 18 is a longitudinal cross-sectional view showing a major portion of a compressor according to another embodiment. A reference numeral 201 denotes a hermetic container within which an electromotive element 102 and a scroll compressive element 203 are contained at an upper portion and a lower portion, respectively. The electromotive element 202 includes a stator 204 and a rotor 205 arranged inside the stator 204. An air-gap 206 is formed between the stator 204 and the rotor 205.

A reference numeral 207 denotes a main frame which is provided with a main bearing 208 at a center thereof. A reference numeral 209 denotes an auxiliary frame pressed and attached to an inner wall of the hermetic container 201, and the auxiliary frame 209 is provided with an auxiliary bearing 210 which is attached eccentrically with respect to the main bearing 208 of the main frame 207. The main frame 207 and the auxiliary frame 209 are fixed to each other by a bolt 202 such that an empty room 211 can be formed.

The scroll compressive element 203 is constructed by a first scroll 213 which is driven by the electromotive element 202 and a second scroll 214 which is rotated in a direction the same as that of the first scroll 213. The first scroll 213 includes a disc-like mirror plate 215, a spiral lap 216 composed of an involute curve that is provided in standing up on one surface of the mirror plate 215, and a driving shaft 217 which is projected on the other surface of the mirror plate 215 at a center thereof and inserted and fixed to the rotor 205. Then, the first scroll 213 constitutes a driving scroll. The second scroll 214 includes a disc-like mirror plate 218, a spiral lap 219 composed of an involute curve that is provided in standing up on one surface of the mirror plate 218, and a driven shaft 217 which is projected on the other surface of the mirror plate 208 at a center thereof. Then, the second scroll 214 constitutes a driven scroll.

The driving shaft 217 of the first scroll 213 is supported by the main bearing 208 of the main frame 207, and the driven shaft 220 of the second scroll 214 is supported by the auxiliary bearing 210 of the auxiliary frame 229. The laps 216 and 219 of the scrolls 213 and 214 are interleaved to each other in a manner that the both are faced to each other within the empty room 211 so that a plurality of compression spaces 221 can be formed. A driven shaft 217 is provided with a discharging hole 223 which discharges the refrigerant compressed within the compression space 221 to an upper space 222 of the electromotive element 220 within the hermetic container 201.

A reference numeral 224 denotes a control member for controlling a movement of the second scroll 214 in an axial direction, and the control member 224 is contacted with the mirror plate 218 of the second scroll 214, and a fixed to the first scroll 213 by a bolt 226 by a cylindrical ring 225. Then, the control member 224, the cylindrical ring 225 and the first scroll 213 forms a space 227 which covers the second scroll 214. A ball bearing 228 is arranged between the control member 224 and an outer periphery of the auxiliary bearing 210 of the auxiliary frame 209.

A reference numeral 229 denotes an Oldam's coupling which vibrates the second scroll 214 relatively to the first scroll 213 while the control member 224 fixed to the first scroll 213 in a unity fashion and the second scroll 214 are rotated in the same direction. A reference numeral 230 denotes a positioning member having an eccentric bush 201 which engaged between the driven shaft 220 of the second scroll 214 and the auxiliary bearing 210 of the auxiliary frame 209. The positioning member 230 is provided with a recess portion 233 which is communicated to the space 227 via a communicating hole 232 formed on the driven shaft 220 of the second scroll 214 at a center thereof. Furthermore, to the positioning member 230, a suction pipe 234 which is communicated to the recess portion 233 is connected through the hermetic container 201. Then, the control member 224, the space 227 surrounded by the first scroll 213 and the cylindrical ring 225 are formed in a low-pressure room.

A reference numeral 235 denotes a seal ring provided on a slidable surface between the control member 224 and the mirror plate 218 of the second scroll 214, and the seal ring 235 isolates the space 227 which forms the low-pressure room from the empty room 211. The empty room 211 is communicated to the inside of the hermetic container 201 through a communicating hole 236 provided on the main frame 207 in an axial direction. Oil supply holes 237 and 238 for lubricating slidable surfaces of the driving shaft 217 and the driven shaft 220 are formed on the main bearing 208 of the main frame 207 and the positioning member 230. A discharging hole 239 for discharging oil stored within the empty room 211 toward an upper portion of the main frame 207 is provided on the main frame 207 and the auxiliary frame 209. The discharging hole 239 is communicated to an oil storing portion 240 of the main frame 207. Furthermore, the oil storing portion 240 is communicated to the oil supply hole 237 of the main frame 207.

A reference numeral 241 denotes a discharge pipe which is provided at an upper portion of the hermetic container 201.

A reference numeral 242 is a copper pipe which is the same as the copper pipe 15 shown in the FIG. 6, and the search coil is attached to the copper pipe 242, and the search coil detects a magnetic flux of a permanent magnet 242 to obtain an output signal. After a lead-wire, and the search coil are contained in the copper pipe 242, the copper pipe is filled by an epoxyresin.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an induction motor which drives a compressor included in a refrigeration cycle, comprising:

a generator comprising an inverter circuit of a PWM system including switching elements which are turned on and off according to switching signals for producing alternating current electric power with a variable voltage and of a frequency which varies as a function of compressor load for powering said motor;

means for storing data concerning optimum numbers of rotations of said motor relative to the frequencies of the variable voltage produced by said generator and supplied to said motor; and means for controlling said variable voltage of said alternating current electric power which is supplied to said motor on the basis of the optimum number of rotations read from said storing means to make the actual number of rotations of said motor become said optimum number of rotations, said means for controlling said variable voltage of said alternating current power comprising means for applying switching signals to said inverter circuit to control the turn on time periods of said switching elements, including means for generating a carrier wave, means for generating a modulation wave, means for generating said switching signals by comparing a level of said carrier wave with a level of said modulation wave, and means for adjusting a level of at least one of said carrier wave and said modulation wave in accordance with said variable voltage.

2. A control apparatus according to claim 1, wherein said carrier wave generating means includes counter means which is incremented or decremented in response to a clock signal, and said modulation wave generating means includes storage means for storing a modulation wave as data.

3. A control apparatus as in claim 1 further comprising means for measuring the actual number of rotations of said motor.

4. A method for changing the capacity of a compressor in accordance with a change of a load for a refrigeration cycle in which the compressor is driven by an alternating current induction motor, comprising the steps of:

(a) generating an alternating current electric power having a variable voltage and a frequency which varies in response to compressor load by an inverter circuit of a PWM system including switching elements which are turned on and off according to switching signals;

(b) storing data concerning optimum numbers of rotations of the induction motor relative to the frequencies of the alternating current electric power;

(c) changing a frequency of said alternating current electric power supplied to said induction motor in accordance with the change of said load;

(d) controlling the variable voltage produced by said generating step by reading an optimum number of rotations from said stored data according to said changed frequency; and (e) increasing or decreasing said variable voltage of said alternating current electric power on the basis of the optimum number of rotations to make the actual number of rotations of said motor become said optimum number of rotations by generating a carrier wave and a modulation wave and comparing the levels of said waves to produce switching signals which are applied to the inverter current switching element to control their turn-on time and adjusting the level of one of said carrier wave and modulation wave in accordance with said variable voltage.

5. A method as in claim 4 further comprising the step of measuring the actual number of rotations of said motor.

* * * * *